2,991,283
SUBSTITUTED AMINO ALKYL ESTERS OF PARA-ALKYL SULFAMIDE BENZOIC ACIDS

Bo Thuresson af Ekenstam, Bofors, and Bror Gösta Pettersson and Fritz Henn, Karlskoga, Sweden, assignors to Aktiebolaget Bofors, Bofors, Sweden, a corporation of Sweden
No Drawing. Filed Jan. 28, 1957, Ser. No. 636,451
4 Claims. (Cl. 260—247.1)

This invention relates to esters of alkyl-sulfamide benzoic acids. In particular it is directed to substituted amino-alkyl esters of para-alkyl sulfamide benzoic acids having the formula:

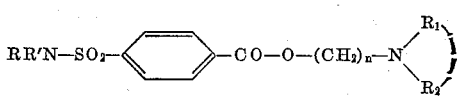

wherein:

R and R' designate hydrogen or alkyl and R+R' collectively have a total carbon content of at least 4 carbon atoms and not more than 10 carbon atoms, and $R_1$ and $R_2$ designate members of the group consisting of hydrogen, an alkyl radical, cyclohexyl or benzyl and when $R_1$ and $R_2$ are linked together directly or indirectly form in combination with the nitrogen atom a ring of the group consisting of piperidine and morpholino radicals and "n" designates the numeral 2 or 3.

In Norwegian Patent No. 88,063, it is stated that sulfamide benzoic acid derivatives of the general formula

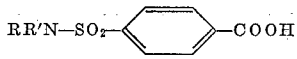

in which R and R' designates alkyl radicals (which radicals collectively have a total carbon content of at least 5 and not more than 8 carbon atoms) exert a blocking effect on the rental tubules. In consequence of such blocking effect, the secretion of some therapeutically valuable substances such as penicillin, sulfonamides and para-aminobenzoic acid is delayed; and as a result of such blocking effect, the concentration of these substances in the blood are elevated which provides for more economical use and simplification in the administration of these drugs.

The novel compounds of this invention have proved to possess the ability of exerting the above-mentioned tubulus-blocking effect, and of forming salts with penicillin which are very difficult to dissolve, which salts have a low toxity. Through the latter characteristic stable penicillin salts are obtained.

The compounds of this invention may be produced by synthetic procedures used for the production of higher esters.

However, it is appropriate to carry out the syntheses of these ester compounds through re-esterification of a lower alkyl ester, preferably a methyl or ethyl ester, in the presence of sodium as a catalyst, and using an excess of the high molecular weight amino alcohol. The esters may be synthesized through the reaction of an acid chloride with the amino alcohol, or through the interaction of a salt of the acid with a halogen compound of an amino alcohol, i.e., the halogen compound in which the halogen occupies the position of the hydroxyl group of the amino alcohol.

A further route for the synthesis is through interaction of the di-acid chloride of the p-sulfobenzoic acid, first with an equivalent quantity of an amino alcohol, and second, amidifying the sulfochloride moiety with the desired alkylamine. By this last mentioned method, the difference in the reaction velocities of the two functional chlorine atoms results first in the formation of the ester linkage, and thereafter, the formation of the amide linkage.

When preparing the novel compounds of this invention by re-esterification of a lower alkyl ester with a high molecular alcohol,

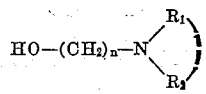

the latter should be used in an excess of at least two mols per one mol of the ester, but not more than ten mols per one mol of the ester. It is preferred to have an excess of 4 mols per one mol.

The invention is illustrated by the following examples:

Example 1

299 weight parts of p-di-n-propylsulfamide benzoic acid methyl ester is re-esterified with 570 weight parts of cyclohexylaminoethanol, in which sodium is brought in order to be used as a catalyzer during re-esterification. After a heat treatment for 3 hours at 90° C. under vacuum, the excess of cyclohexylaminoethanol is distilled off. The residue is dissolved in water, and extracted with ether. The raw base is dissolved in e.g. ethanol, and dry chlorohydrocarbon is introduced to salt formation. The hydrochloride is filtered off, washed with ethanol and dried. The salt is dissolved in water and carbon treated, after which the base is precipitated again with ammonium. The released base is extracted with ether, after which the ether is distilled off, after first having been dried with sodium sulfate. The p-di-n-propyl sulfamide benzoic acid cyclohexylaminoethyl ester is obtained in purified form.

Example 2

285 weight parts of p-di-n-propylsulfamide benzoic acid are chlorinated with 800 weight parts of thionyl chloride at 80° C. for 1 hour. The excess of thionyl chloride is distilled off in vacuum, and the residue, which consists of acid chloride, is dissolved in 250 cc. of chloroform. 143 weight parts of cyclohexylaminoethanol dissolved in 200 cc. chloroform are saturated with dry hydrochloric acid gas and added to the acid chloride solution. Under the addition, the temperature may be allowed to rise to 40° C. The temperature is thereafter kept at 40° for 48 hours. Thereafter the solution is cooled, water added, and the ester liberated with ammonia. The ester then dissolves in the chloroform, which is separated off, dried with sodium sulfate, and the chloroform is distilled off in vacuum. The raw base is dissolved in e.g. ethanol, and dry chlorohydrocarbon is introduced to salt formation. The hydrochloride is filtered off, washed with ethanol and dried. The salt is dissolved in water and carbon treated, after which the base is precipitated again with ammonium. The released base is extracted with ether, after which the ether is distilled off, after first having been dried with sodium sulfate. p-di-n-propylsulfamide benzoic acid cyclohexylaminoethyl ester is obtained in purified form.

Example 3

240 weight parts of p-sulfopotassium benzoic acid, suspended in toluol, are chlorinated with 166 weight parts of phosphorus pentachloride at 90° C. for 1 hour. The dichloride solution is thereafter allowed to react with an equivalent quantity of cyclohexylaminoethanol hydrochloride in toluol. After 48 hours at 40° C., the reaction mixture is cooled with ice water, and cold water is added. The toluol is separated off, and the ester salt of the sulfochloride is fed in under cooling at 10–15° in a suspension of 150 weight parts di-n-propylamine in 5% lye, while stirring. The alkyl ester formed is extracted from the water with ether. The raw base is dissolved in e.g. ethanol, and dry chlorohydrocarbon is introduced to salt formation. The hydrochloride is filtered off, washed with ethanol and dried. The salt is dissolved in water and carbon treated, after which the base is precipitated again with ammonium. The released base is extracted with ether, after which the ether is distilled off, after first having been dried with sodium sulfate. P-di-n-propylsulfamide benzoic acid cyclohexylaminoethyl ester is obtained in purified form.

Example 4

P-diethyl sulfamide benzoic acid methyl ester is reesterified with an excess of dimethylaminoethanol as in Example 1. After working up and purifying, p-diethyl sulfamide benzoic acid dimethylaminoethyl ester is obtained.

Example 5

P-dibutyl sulfamide benzoic acid methylester is reesterified with an excess of diethylaminoethanol as in Example 1. After working up and purifying, p-dibutyl sulfamide benzoic acid diethylaminoethyl ester is obtained.

Example 6

P-di-n-propyl sulfamide benzoic acid chloride is esterified with benzyl aminoethanol hydrochloride as in Example 2. After working up and purifying, p-di-n-propyl sulfamide benzoic acid benzyl aminoethyl ester is obtained.

Example 7

P-ethyl butyl sulfamide benzoic acid chloride is esterified with morpholino-ethanol as in Example 2. After working up and purifying, p-ethyl butylsulfamide benzoic acid morpholino ethyl ester is obtained.

Example 8

P-di-n-amylsulfamide benzoic acid methylester is reesterified with an excess of dimethylaminoethanol as in Example 1. After working up and purification, p-di-n-amyl-sulfamide benzoic acid dimethylaminomethylester is obtained.

Example 9

P-mono-n-propylsulfamide benzoic acid methylester is reesterified with an excess of morpholinethanol, as in Example 1. After working up and purification, p-mono-n-propylsulfamide benzoic acid morpholinethylester is obtained.

Example 10

P-di-n-propylsulfamide benzoic acid methylester is reesterified with an excess of dicyclohexylaminoethanol as in Example 1. After working up and purfication, p-di-n-propylsulfamide benzoic acid dicyclohexylaminoethylester is obtained.

Example 11

P-di-n-propylsulfamide benzoic acid methylester is reesterified with an excess of 1-piperidine ethanol as in Example 1. After working up and purification, p-di-n-propyl sulfamide benzoic acid-1-piperidine ethylester is obtained.

Example 12

P-di-n-propyl sulfamide benzoic acid ethylester is reesterified with an excess of dimethylaminopropanol as in Example 1. After working up and purification, p-di-n-propyl sulfamide benzoic acid dimethylaminopropylester is obtained.

It will be understood that the foregoing description of the invention and the examples set forth are merely illustrative of the principles thereof. Accordingly, the appended claims are to be construed as defining the invention within the full spirit and scope thereof.

We claim:

1. Compounds of the group of substituted amino alkyl esters of para-alkyl sulfamide benzoic acids and the pharmaceutically acceptable acid addition salts thereof whereof in the free-base form has the structural formula:

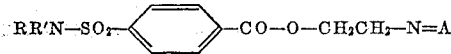

wherein: R and R' designate members of the group consisting of hydrogen and alkyl radicals, whereof the total number of carbon atoms in the combination of R and R' is at least 4 carbon atoms and not more than 10 carbon atoms, and the unit N=A designates a member of the group consisting of cyclohexylamino, benzylamino and morpholino.

2. The p-di-n-propyl sulfamide benzoic acid ester of cyclohexyl-amino-ethanol.

3. The p-di-n-propylsulfamide benzoic acid ester of benzylaminoethanol.

4. The p-(ethyl) (butyl) sulfamide benzoic acid ester of morpholinoethanol.

References Cited in the file of this patent

UNITED STATES PATENTS 2,789,938    Wilcox et al. _____ Apr. 23, 1957

OTHER REFERENCES

Karrer Organic Chemistry, 2nd ed., 1946, Elsevier Publ. Co., Inc., N.Y., p. 199.

Beilsteins Handbuch der Organischen Chemie, vol. XI, second supplement, page 218 (1950).